United States Patent
Yoshida et al.

[11] Patent Number: 6,156,233
[45] Date of Patent: Dec. 5, 2000

[54] CATHODE RAY-LUMINESCENT PHOSPHOR AND METHOD FOR THE PREPARATION THEREOF

[75] Inventors: Akira Yoshida, Tosu, Japan; Reinhart Job, Hagen, Germany

[73] Assignee: Japan as represented by Director General of Agency of Industrial Science and Technology, Tokyo-to, Japan

[21] Appl. No.: 09/266,920

[22] Filed: Mar. 12, 1999

[30] Foreign Application Priority Data

Nov. 13, 1998 [JP] Japan ................................ 10-338414

[51] Int. Cl.[7] .................................................. C09K 11/08
[52] U.S. Cl. .................................. 252/301.4 R; 502/74; 502/79; 502/85
[58] Field of Search ....................... 252/301.4 R; 502/79, 502/74, 85

[56] References Cited

U.S. PATENT DOCUMENTS

| | | | |
|---|---|---|---|
| 3,546,096 | 12/1970 | Kittrell | 502/74 |
| 3,591,488 | 7/1971 | Eberly, Jr. et al. | 208/111 |
| 3,617,527 | 11/1971 | Hilfman | 502/74 |
| 3,677,972 | 7/1972 | Gutberlet et al. | 502/74 |
| 4,820,402 | 4/1989 | Partridge et al. | 502/79 |
| 4,983,274 | 1/1991 | Chen et al. | 502/74 |
| 5,401,704 | 3/1995 | Absil et al. | 502/74 |

*Primary Examiner*—C. Melissa Koslow
*Attorney, Agent, or Firm*—Wenderoth, Lind & Ponack, L.L.P.

[57] ABSTRACT

Disclosed is a novel cathode ray-luminescent phosphor which is a composite body consisting of a dealuminized zeolite carrying a specified amount of a metal such as tin, cobalt and nickel or an oxide thereof within the pores of the dealuminized zeolite structure. The cathode ray-luminescent phosphor is prepared by a method comprising the steps of: (a) heating an ammonium-form zeolite in the presence of steam to effect dealuminization of the zeolite; (b) impregnating the dealuminized zeolite with an aqueous solution of a metal salt in an amount of the metal salt in the range from 10 to 60 parts by weight calculated as metal per 100 parts by weight of the dealuminized zeolite; (c) drying the dealuminized zeolite impregnated with the aqueous metal salt solution; and (d) calcining the dried zeolite in a reducing or oxidizing atmosphere at a temperature in the range from 450 to 600° C. for 1 to 5 hours to form a composite of the dealuminized zeolite and the metal or an oxide of the metal, respectively.

1 Claim, 3 Drawing Sheets

CATHODE RAY-LUMINESCENT PHOSPHOR AND METHOD FOR THE PREPARATION THEREOF

BACKGROUND OF THE INVENTION

The present invention relates to a novel cathode ray-luminescent phosphor or, namely, a phosphor material capable of emitting luminescence by irradiation with cathode rays or electron beams as well as to an efficient method for the preparation thereof.

Cathode ray-luminescent phosphors in general are widely employed as a luminescent material in cathode-ray tubes and displays. Known cathode ray-luminescent phosphors in a major part include those of the type of a composite compound based on a zinc compound such as $Zn_2SiO_4$, ZnCdS and the like as the host material activated with manganese or silver.

On the other hand, proposals are made for the use of a zeolite as a catalyst carrier material supporting a small amount of a metallic element or a metal oxide as a catalytically active ingredient for various chemical reactions. None of these zeolite-based composite materials, however, are known to exhibit a behavior as a cathode ray-luminescent phosphor.

As is mentioned above, the cathode ray-luminescent phosphors known in the prior art are mostly those based on a zinc compound and a less number of reports are available on cathode ray-luminescent phosphors of other types. This is the reason for the limited application fields of the cathode ray-luminescent phosphors. Accordingly, it would be a due idea to develop a cathode ray-luminescent phosphor of a different type, with which the application fields of cathode ray-luminescent phosphors could be greatly expanded along with a possibility of still greater expansion of the application fields by combining the same with other conventional phosphor materials.

SUMMARY OF THE INVENTION

The present invention has been completed with an object to comply with the above mentioned prospect relative to the development of a cathode ray-luminescent phosphor of a novel type.

Thus, the cathode ray-luminescent phosphor of the present invention, which has been developed as a result of the extensive investigations undertaken by the inventors with the above mentioned object, is a composite body consisting of a dealuminized zeolite having pores filled with a metallic element or a metal oxide, of which the amount of the metallic element or the amount of the metal oxide calculated as metal is in the range from 10 to 60 parts by weight per 100 parts by weight of the dealuminized zeolite.

The above defined novel cathode ray-luminescent phosphor of the invention can be prepared by a method which comprises the steps of:

(a) heating an ammonium-form zeolite in the presence of steam to effect dealuminization of the zeolite structure;

(b) impregnating the dealuminized zeolite with an aqueous solution of a metal salt in an amount of the metal salt in the range from 10 to 60 parts by weight calculated as metal per 100 parts by weight of the dealuminized zeolite;

(c) drying the dealuminized zeolite impregnated with the aqueous solution of the metal salt; and (d) calcining the dried zeolite in a reducing atmosphere to form a composite of the dealuminized zeolite and the metallic element.

Alternatively, the step (d) of calcination of the dried zeolite is undertaken in an oxidizing atmosphere so that the material obtained by calcination is a composite of the dealuminized zeolite and an oxide of the metallic element.

DETAILED DESCRIPTION OF THE PREFERRED EMBODIMENTS

Figure 1:
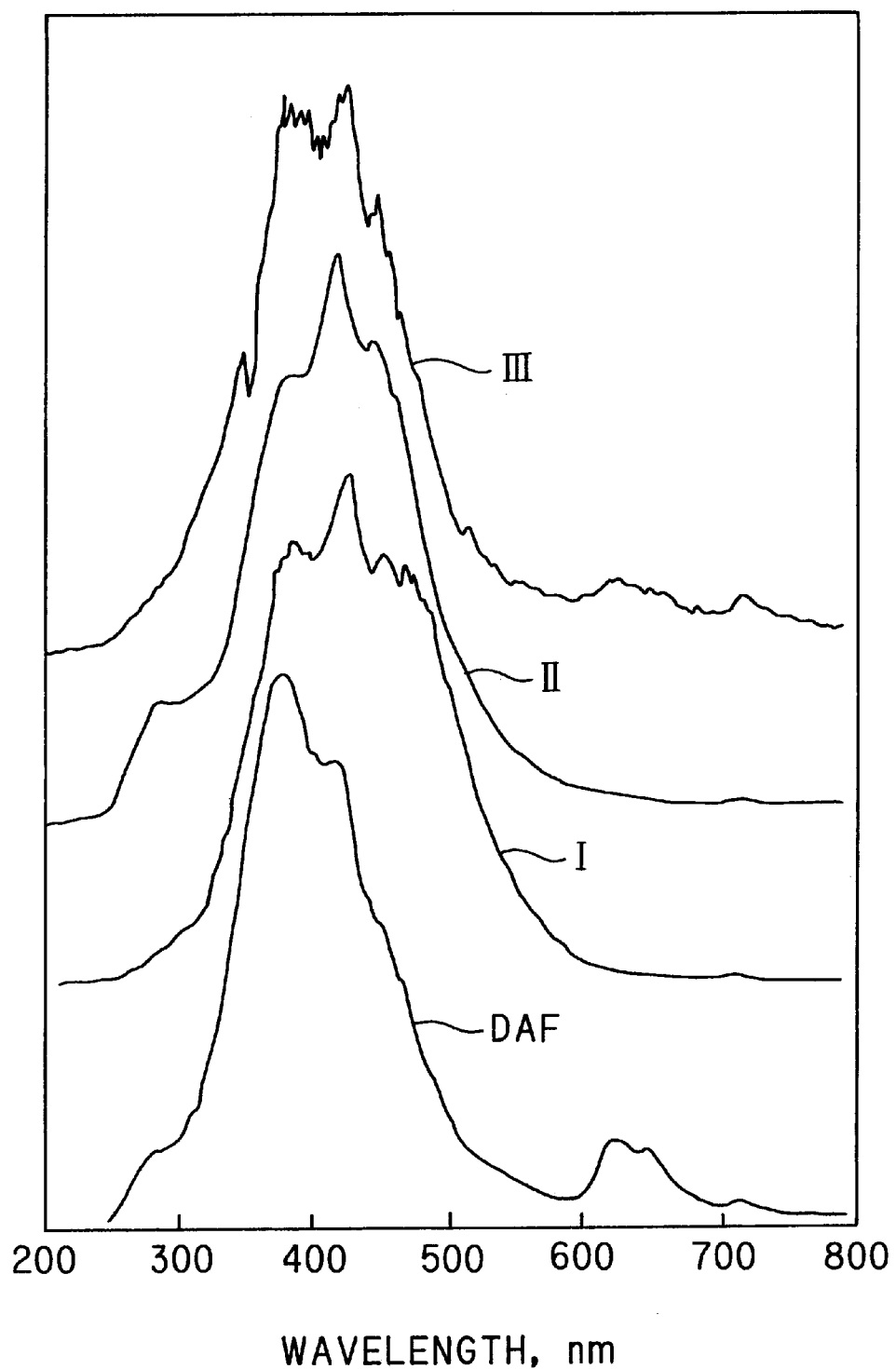
FIG. 1 shows cathode luminescence spectra of zeolite-metallic tin composite phosphors.

As is described above, the cathode ray-luminescent phosphors of the present invention include dealuminized zeolite-metal composite bodies and dealuminized zeolite-metal oxide composite bodies. A semiconductor is formed inside of the pores of the zeolite by the combination of the fine alumina particles separated from the skeleton of the zeolite structure by dealuminization and the fine particles of a metal such as tin, nickel, cobalt and the like or an oxide thereof. The electrons in the valence band of the semiconductor are excited to the conduction band by irradiation with cathode rays to emit luminescence by recombination of the excited conduction band electrons with positive holes. The wavelength region of the luminescence can be varied by selecting the kind of the metal or metal oxide supported by the fine particles of alumina.

The cathode ray-luminescent phosphor of the present invention can be prepared by a method comprising the steps of: subjecting a zeolite to a dealuminizing treatment by heating an ammonium-form zeolite in the presence of steam; impregnating the dealuminized zeolite with an aqueous solution of a metal salt in an amount of 10 to 60 parts by weight calculated as metal per 100 parts by weight of the dealuminized zeolite; drying the zeolite impregnated with the aqueous solution; and calcining the dried zeolite in a reducing atmosphere or in an oxidizing atmosphere so that the metal salt impregnating the zeolite is reduced into the metallic form or oxidized into an oxide of the metallic element to give a composite of the dealuminized zeolite and a metallic element or a metal oxide.

The zeolite as the starting material in the above described preparation procedure is not particularly limitative and can be selected from natural zeolites and synthetic zeolites, of which X-type, Y-type and Z-type zeolites are preferable and, in particular, Y-type zeolites are more preferable. It is essential in the inventive method that the starting zeolite is first subjected to dealuminization before impregnation with an aqueous metal salt solution. The procedure of the dealuminizing treatment is known in the art, in which an ammonium-form zeolite is heated in the presence of steam at a temperature of 600 to 850° C. The dealuminization can be accomplished by repeating the steam treatment. Commercial products of dealuminized zeolite are available on the market and can be used as such in the present invention including, for example, a nearly complete dealuminization product (tradename DAF, a product by CATALYSTS & CHEMICALS IND. CO., LTD.).

The dealuminized zeolite is then impregnated with an aqueous solution of a water-soluble metal salt. Suitable water-soluble metal salts include halides of a metallic element such as tin, cobalt and nickel exemplified by tin chloride, cobalt chloride and nickel chloride and carbonates and nitrates of these metallic elements. The concentration of the metal salt in the aqueous solution should be as high as possible up to saturation but is preferably in the range from 0.5 to 5 moles/liter from the practical standpoint.

The dealuminized zeolite impregnated with the aqueous metal salt solution is then dried by heating, for example, on a sand bath to evaporate water to dryness so that the metal salt is deposited within the pores of the dealuminized zeolite. The zeolite particles bearing the metal salt within the pores are then subjected to a calcination treatment, for example, in a tubular electric furnace under a reducing atmosphere such as a stream of hydrogen gas or under an oxidizing atmosphere such as a stream of air or oxygen gas. The calcination treatment is performed by increasing the furnace temperature up to 450 to 600° C. at a temperature elevation rate of 1 to 5° C./minute and then keeping the temperature in the above mentioned temperature range for 1 to 5 hours followed by gradual cooling down to room temperature to give a composite body of a dealuminized zeolite and a metal or metal oxide as the desired cathode ray-luminescent phosphor.

The amount of the metallic element or metal oxide contained in the cathode ray-luminescent phosphor of the invention must be in the range from 10 to 60 parts by weight calculated as metal per 100 parts by weight of the dealuminized zeolite. This content of the metal or metal oxide is unique and characteristically high as compared with conventional zeolite-based catalytic materials containing a metal or metal oxide supported on a zeolite because the content of the metal or metal oxide in such a catalyst material never exceeds a few % by weight.

In the following, the cathode ray-luminescent phosphor and the method for the preparation thereof according to the invention are described in more detail by way of Examples.

EXAMPLE 1

A 3 g portion of a Y-type zeolite dealuminized by repeating five times of steam treatments was taken in a evaporating dish of fused silica glass together with 3 ml of a 1 mole/liter aqueous solution of tin chloride $SnCl_2$ and the dish was heated on a sand bath to effect evaporation of water to dryness. After disintegration and grinding by using a porcelain mortar and pestle, a 1 g portion of the thus dried and ground material was taken on an alumina boat which was put into a tubular electric furnace. The furnace tube was flushed at room temperature first with nitrogen gas for 40 minutes at a flow rate of 30 ml/minute and then with hydrogen gas for 30 minutes at the same flow rate followed by increase of the furnace temperature up to 500° C. at a temperature elevation rate of 3° C./minute under continued flowing of hydrogen gas. After keeping the temperature of the furnace at 500° C. for 2 hours with continued flowing of hydrogen gas, the temperature was decreased at a rate of 3° C./minute to room temperature to give a composite body of the dealuminized zeolite and metallic tin.

The same preparation procedure as described above was repeated excepting for the increase of the volume of the aqueous tin chloride solution from 3 ml to 6 ml, 9 ml, 12 ml or 15 ml to prepare a series of composite bodies of the dealuminized zeolite and varied amounts of metallic tin. The contents of metallic tin in these five composite bodies were 11.9%, 23.7%, 35.8%, 47.5% and 59.4% by weight, respectively, based on the dealuminized zeolite.

EXAMPLE 2

A dealuminized zeolite impregnated with tin chloride as dried was prepared in the same manner as in Example 1. After disintegration and grinding by using a porcelain mortar and pestle, a 1 g portion of the thus dried and ground material was taken on an alumina boat which was put into a tubular electric furnace. The furnace tube was flushed at room temperature first with nitrogen gas for 40 minutes at a flow rate of 30 ml/minute and then with oxygen gas for 30 minutes at the same flow rate followed by increase of the furnace temperature up to 500° C. at a temperature elevation rate of 3° C./minute with continued flowing of oxygen gas. After keeping the temperature of the furnace at 500° C. for 2 hours with continued flowing of oxygen gas, the temperature was decreased at a rate of 3° C./minute to room temperature to give a composite body of the dealuminized zeolite and tin oxide.

A series of composite bodies of the dealuminized zeolite and tin oxide in varied contents were prepared in the above described manner by using 3 ml, 6 ml, 9 ml, 12 ml and 15 ml of the aqueous tin chloride solution to impregnate 3 g of the dealuminized zeolite. The contents of tin oxide in these five composite bodies were 11.9%, 23.7%, 35.8%, 47.5% and 59.4% by weight, respectively, calculated as tin metal based on the dealuminized zeolite.

EXAMPLE 3

The composite bodies of the dealuminized zeolite and metallic tin or tin oxide prepared in Examples 1 and 2, respectively, were each compression-molded into a powder compact which was set in an apparatus for electron beam irradiation and irradiated therein with 5 keV electron beams of 10 mA under a high vacuum of $1 \times 10^{-5}$ Torr at a temperature of 77 K to observe good luminescence.

Figure 2:
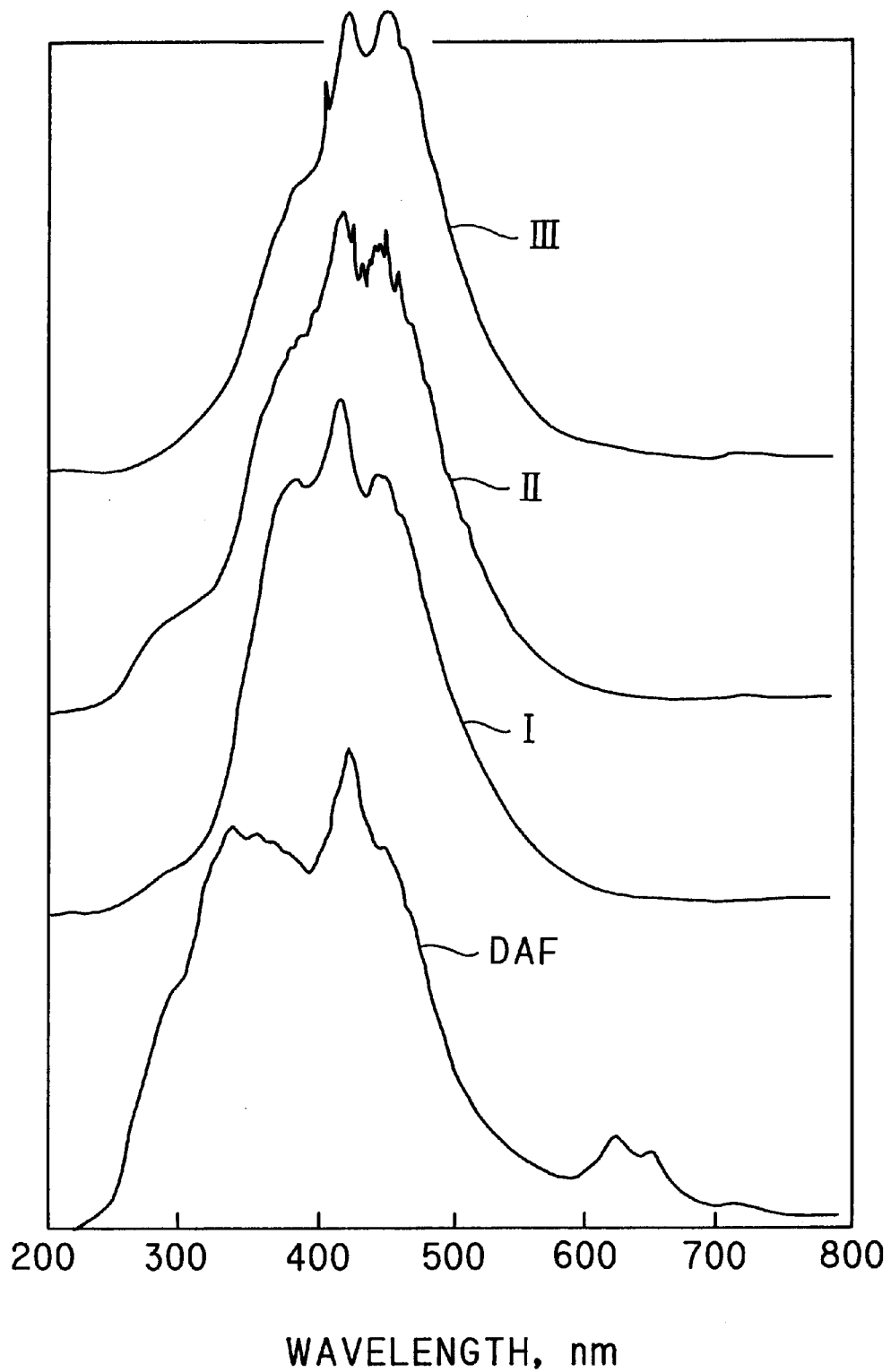
FIG. 2 shows cathode luminescence spectra of zeolite-tin oxide composite phosphors.

FIGS. 1 and 2 of the accompanying drawing each show the luminescence spectra of the composite bodies of the dealuminized zeolite and metallic tin and tin oxide, respectively, prepared in Examples 1 and 2. The spectra I, II and III are the luminescence spectra of the composite bodies of which the content of metallic tin or tin oxide calculated as tin metal is 11.9%, 35.8% or 59.4% by weight, respectively, based on the dealuminized zeolite. The spectra DAF in FIGS. 1 and 2 are each for the commercially obtained dealuminized zeolite (tradename DAF, supra) per se after the calcination treatment in hydrogen or in oxygen, respectively, without impregnation with tin chloride.

Figure 3:
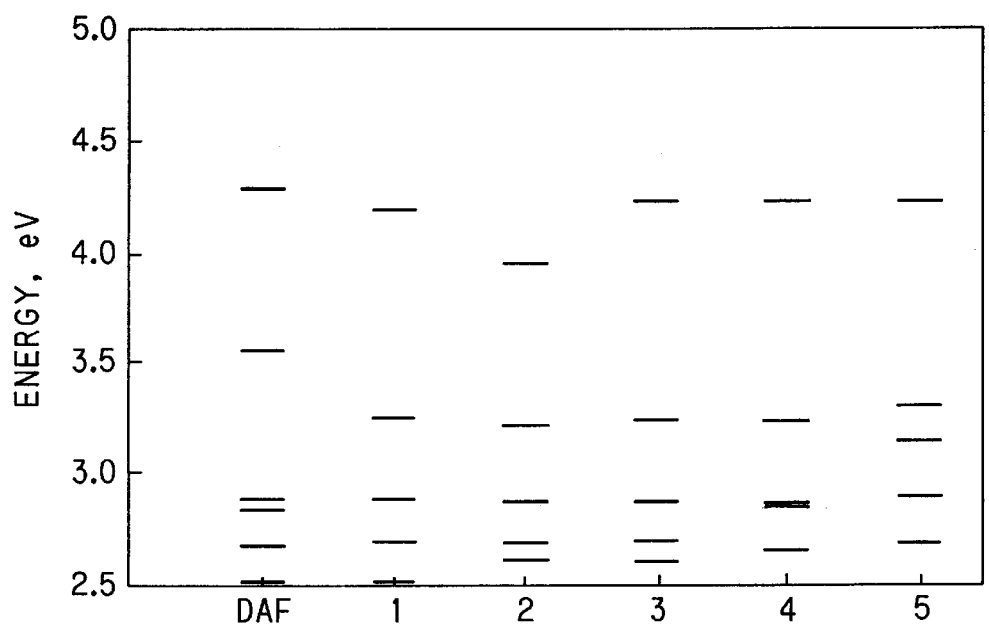
FIG. 3 is a diagram showing the relationship between the luminescence energy of the principal peaks of the cathode luminescence of zeolite-metallic tin composite phosphors and the amount of the metallic tin carried by the zeolite.

FIG. 3 shows the energy diagrams of the principal peaks in the luminescence spectra from the composite bodies of the dealuminized zeolite and metallic tin prepared in Example 1. The diagrams numbered 1, 2, 3, 4 and 5 are for the contents of metallic tin of 11.9%, 23.7%, 35.8%, 47.5% and 59.4% by weight, respectively, based on the dealuminized zeolite and the diagram DAF is for the commercially obtained dealuminized zeolite DAF without metallic tin after the reducing calcination treatment. These energy diagrams indicate that a shift of the principal peaks toward the visible region side is effected in the composite bodies with metallic tin.

What is claimed is:

1. A method for the preparation of a cathode ray-luminescent phosphor which comprises the steps of:

(a) heating an ammonium-form zeolite in the presence of steam to effect dealuminization of the zeolite;

(b) impregnating the dealuminized zeolite with an aqueous solution of a metal salt in an amount of the metal salt in the range from 10 to 60 parts by weight calculated as metal per 100 parts by weight of the dealuminized zeolite;

(c) drying the dealuminized zeolite impregnated with the aqueous solution of the metal salt; and (d) calcining the dried zeolite in a reducing atmosphere at a temperature in the range from 450 to 600° C. for 1 to 5 hours to form a composite of the dealuminized zeolite and the metallic element.

* * * * *